Sept. 28, 1965 A. F. WITTENBORN ETAL 3,209,315

SIGNAL CORRELATION METHOD AND APPARATUS

Filed Nov. 29, 1960 5 Sheets-Sheet 1

INVENTORS
AUGUST F. WITTENBORN,
NELSON N. ESTES &
ALTON O. CHRISTENSEN

BY Irons, Birch, Swindler & McKie
ATTORNEYS

Sept. 28, 1965 A. F. WITTENBORN ET AL 3,209,315

SIGNAL CORRELATION METHOD AND APPARATUS

Filed Nov. 29, 1960 5 Sheets-Sheet 2

TRACK SCAN GENERATOR

INVENTORS
AUGUST F. WITTENBORN,
NELSON N. ESTES &
ALTON O. CHRISTENSEN

BY Irons, Birch, Swindler & McKie
ATTORNEYS

SIGNAL CORRELATION METHOD AND APPARATUS

Filed Nov. 29, 1960 5 Sheets-Sheet 3

INVENTORS
AUGUST F. WITTENBORN,
NELSON N. ESTES &
ALTON O. CHRISTENSEN

BY Irons, Birch, Swindler & McKie
ATTORNEYS

DISPLAY STORAGE AND DISPLAY

INVENTORS

AUGUST F. WITTENBORN,
NELSON N. ESTES &
ALTON O. CHRISTENSEN

BY Irons, Birch, Swindler & McKie

ATTORNEYS

Sept. 28, 1965 A. F. WITTENBORN ET AL 3,209,315

SIGNAL CORRELATION METHOD AND APPARATUS

Filed Nov. 29, 1960 5 Sheets-Sheet 5

INVENTORS
AUGUST F. WITTENBORN,
NELSON N. ESTES &
ALTON O. CHRISTENSEN

BY Irons, Birch, Swindler & McKie
ATTORNEYS

United States Patent Office 3,209,315

Patented Sept. 28, 1965

3,209,315
SIGNAL CORRELATION METHOD AND APPARATUS

August F. Wittenborn, Austin, Alton O. Christensen, Houston, and Nelson N. Estes, Austin, Tex., assignors to Dresser Industries, Inc., Dallas, Tex., a corporation of Delaware Filed Nov. 29, 1960, Ser. No. 72,349
32 Claims. (Cl. 340—6)

This application relates to correlation, and, more particularly, to a method and apparatus for voltage correlation by integration techniques.

In the electronic arts it is often necessary to extract a signal from a voltage in which that signal is buried, as by "noise" voltages. When the signal to noise ratio is greater than unity, such extraction is relatively easy, but when the ratio is less than unity the problem becomes more difficult. Various signal correlation techniques have been used in the past to solve the problem, one involving the repetitive recording of the input in a storage device. With this technique, since noise is generally random and signals repetitive, the signals would tend to add directly, while the noise would, if not cancel out, at least not increase as rapidly as signal during repetition. An elementary use of this technique is evident in a pulse radar system wherein the cathode ray display tube forms the storage device and the repetitive radiation of the transmitted pulse toward a target and reflection therefrom to the receiver allows repetitive recording of the receiver output on the storage tube. Though this technique is quite useful, much of its advantage is dissipated if the target is moving.

Another correlation technique involves the use of a coded signal, one of a "high degree of character." For instance, in distance measuring equipment, the airborne transmitter radiates a coded signal which is re-radiated by the ground equipment, in similar coded fashion, so that the receiver can be set to respond only to a signal of the particular coding selected. Unfortunately, this technique is useful only in connection with an "active" system, that is, one in which a signal is transmitted from the detection equipment.

The correlation technique of the present invention is particularly adapted for use in a "passive" sonar system, though it may also be advantageously employed in an "active" sonar system, in a radar system, or indeed in any system which provides a signal buried in an electrical voltage and in which the signal has a "track" with respect to such parameters as, e.g., bearing and time.

In a "passive" sonar system, no energy is radiated from the detection equipment, so that the coded signal correlation technique is not applicable, and an extremely important desideratum is the detection of "targets" which are moving with respect to the detection apparatus, so that the repetition technique does not provide the complete answer. This invention can, however, be applied to such a system and may indeed be combined with other correlation techniques, such as repetition.

In one type of passive sonar system a number of transducers are connected together in such a fashion as to form a plurality of "beams" or "lobes" of sensitivity which extend out at different bearings from the system. A number of output voltages determined by the number of beams is then available, and these voltages, which include a great deal of pure noise, as well as some target or signal voltages, must be processed in order to extract the signal voltages from the output voltages. After rectification these output voltages are supplied to an integrator or averager which averages the voltages over preset time periods. Since the processing gain furnished by the integrator (the ratio of the output signal to noise ratio to the input signal to noise ratio) is proportional to the square root of the integration time, it is desirable to have the integration time as long as possible. However, this proportionality only holds true as long as the integration time is no greater than the signal duration, and processing gain drops off with integration time if the latter is greater than signal duration. Consequently, the averaging time must be limited. Normally, the averaging time is set at some level which experience indicates to be desirable but this level, once fixed, cannot vary with signal duration and is usually too short for greatest processing gain.

The output of the averaging device is conventionally indicated on a suitable display device, such as a cathode ray oscilloscope, with bearing and time the display coordinates and intensity the display parameter. The operator is expected to view the display and to decide from the shape and length of the tracks thereon whether and what targets are indicated. Since the integration time is necessarily not optimum, the processing gain of the averager is insufficient and the operator is forced to dig out of all the noise voltages displayed any targets that are exhibited. Particularly when several targets are involved, this is an extremely difficult task.

The present invention enables a greater processing gain to be obtained, thus simplifying the operator's problem, by providing an integration time which varies with signal duration and is, if not optimum, at least good enough. The rectified output of the transducer system is recorded in some form of memory for a desired time interval in the immediate past and the memory is scanned over all probable signal paths in space. The reproduced voltage is integrated during each scan and compared with a suitable threshold voltage. When the integrated voltage exceeds the threshold voltage, a "detection" occurs. The duration of the scan till detection is of course the integration time and is dependent upon the number of signal samples present in that scan. Since that characteristic is not known beforehand, the integration time is unknown, though it may of course be extracted from the system if that is desired. Preferably, integration is stopped at the time of such "detection," and the detection is indicated with relation to the scan during which is occurred.

Since the output of the integrator of course varies with the level of the noise voltages in the memory, as well as with signal level, and since noise level may change appreciably from beam to beam and from time to time, a voltage representative of the average noise level is preferably generated and compared with the integrated voltage during the various track scans. The integrated voltage of course increases with time and the voltage to be compared therewith may, therefore, appropriately be the output of an integrator supplied with the average voltage. Then the difference voltage between the two integrated voltages may be compared with a threshold voltage which decreases with time, in order to avoid false detections which might result from noise peaks encountered by the scanning device near the beginning of a track scan when the integrated voltage is more greatly influenced by such peaks than after it has built up to a higher voltage. Then, the difference voltage may be subtracted from the threshold voltage and, whenever the former exceeds the latter, a "detection" may be indicated.

Because of the relative ease of scanning electrostatic storage tubes and the fact that analog voltages may readily be stored therein, it is preferred that such a tube be used for the storage function. However, magnetic core or drum storage might also be used and might even be preferable for some applications. In fact any kind of voltage storage which is susceptible of scanning along a plurality of paths may be employed.

While the invention will be described more fully hereinafter in conjunction with a passive sonar system, it will be appreciated that it is not limited to such application and may indeed be useful whenever signals must be extracted from variable voltages.

A preferred embodiment of the invention will now be described in conjunction with the drawings in which.

Figure 1:
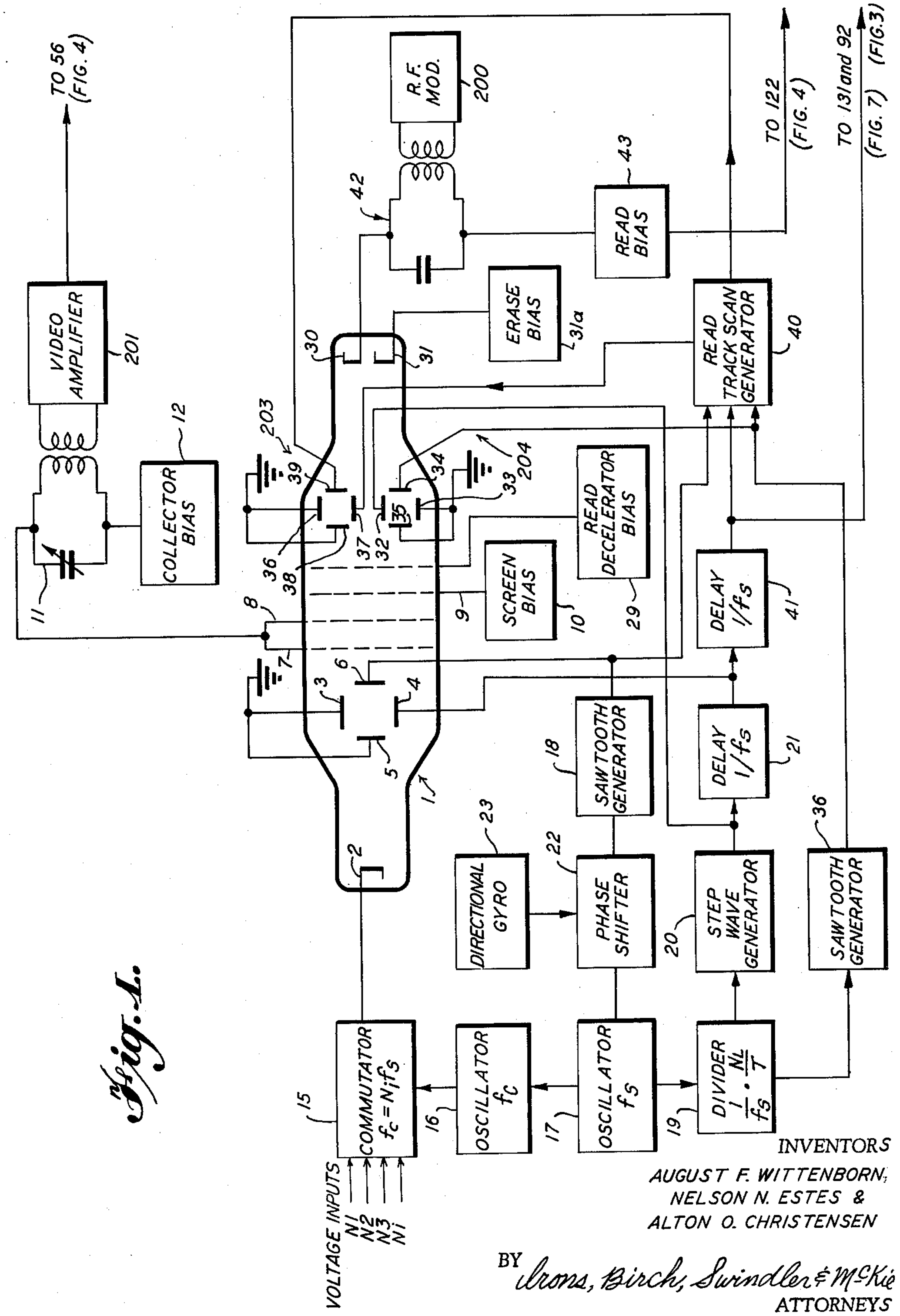
FIG. 1 is a block diagram illustrating the intermediate storage device of the invention, together with the various sweep circuits therefor.

Referring first to FIG. 1, the intermediate storage device is there shown as an electrostatic storage tube 1 and includes a write gun having a cathode 2 and the usual beam-forming and -accelerating electrodes, as well as the focusing system (not shown). The cathode ray beam from the cathode 2 is deflected by a set of vertical deflection plates 3 and 4 and a set for horizontal deflection plates 5 and 6. After passage through the deflection area, the beam goes through a write decelerator electrode 7 and a collector electrode 8 before striking the electrostatic storage screen 9. The storage screen 9 preferably is of the type employed in the Raytheon CK 7702 recording storage tube, described in a Raytheon technical information bulletin dated March 15, 1960. It includes a metal grid or screen covered with a dielectric material. The metal screen is connected to an appropriate screen bias source 10 as indicated in FIG. 1. The write decelerator 7 and collector 8 are connected together and through an appropriate tuned circuit 11 to a collector bias source 12. The purpose of the tuned circuit will be discussed hereinafter.

If a plurality of input voltages, such as supplied by a multi-beam sonar system, are to be correlated and displayed, these inputs, identified as $N_1$, are supplied to cathode 2 through a commutator 15. The commutator 15 is controlled by an oscillator 16 which supplies the commutating frequency, which is determined by the product of the number of signal inputs and the signal sampling frequency. The sampling frequency is supplied by an oscillator 17, which is connected to oscillator 16, to synchronize the commutator frequency with the sampling frequency. The sampling frequency is selected in accordance with well-known principles to be at least as high as twice the frequency of the highest frequency of interest in the signal inputs.

The commutator 15, like the other elements so far described, may be of well-known design, and is operable to sequentially connect the various signal sources to the write cathode 2. The signal inputs are appropriately rectified before being applied to the commutator, so that they are variable D.-C. voltages. As will be apparent hereinafter, some integration of the signal inputs is performed on the storage screen 9, but it may also be appropriate to integrate the signal inputs before commutation. For instance, each signal input could be supplied to an appropriate integrator which would average each signal input over a period of time of the order of several seconds.

The sampling frequency oscillator 17 drives a saw tooth sweep generator 18 which is connected to the horizontal deflection electrode 6. The other horizontal electrode 5, and the vertical deflection electrode 3 are grounded. Sweep generator 18 provides a saw tooth voltage of the same frequency as the sampling frequency supplies by oscillator 17.

The sampling frequency is also supplied to a divider 19 which divides the sampling frequency to obtain a line frequency which will be determined by the number of horizontal lines of the storage tube and by the number of seconds of information that are to be stored on the tube. For instance, if the number of lines per "frame" is 600 and the number of seconds of information stored is 600, the sampling frequency would be divided by itself to obtain an output of 1 line per second. The output of the divider 19 is supplied to a step wave generator 20, and, after delay of that step wave by the time period of one line, obtained through delay circuit 21, the step wave is supplied to vertical deflection plate 4. Thereby, the electron beam of the write gun is caused to scan across one line many times, then to step to the next line and repeat the scanning across it, then to step to the next line, etc.

Each time that the write beam scans across a horizontal line on the storage screen 9, it causes secondary electrons to be emitted from each elemental area of the dielectric material on the screen. The number of electrons emitted is proportional to the intensity of the beam at each instant, and, since the beam intensity is determined by the signal input supplied to the cathode 2, at each instant, the number of secondary electrons emitted from each elemental area will be proportional to the amplitude of the signal input that is supplied to the cathode at that instant. The secondary electrons emitted from the dielectric material are picked up by the collector 8, but the current in the collector due to *these* secondary electrons has no further function in the apparatus.

The dielectric screen 9, therefore, stores a charge in each elemental area which is determined by the intensity of the electron beam at the time it strikes that area. Since the beam sweeps across each line a number of times, the charge is built up, so that integration is performed by the write beam and the storage screen 9. This type of integration may be sufficient to make a very low signal level apparent, despite such stronger noise levels, since the noise will be random and will not tend to reinforce itself, while the signal will be repetitive. However, the invention is intended to pick out signals from noise levels that are so much higher than the signal levels that this repetitive integration will not be sufficient. The further correlation steps contemplated by this invention will be described hereinafter.

Figure 2:
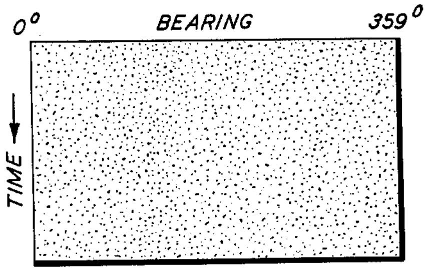
FIG. 2 is a sketch showing the manner in which the voltages stored in the intermediate storage device would appear if they were visible and if they were recorded as variations about an average level.

For convenience in explanation of the function of this invention it will be assumed, not only that the signal inputs are the "beams" of a passive sonar system, but also that it is desired to pick out from the noise in such beams the signals as a function of bearing and time. For such use, the horizontal dimension of the storage screen 9 would represent bearing and the vertical dimension time. In such a use of the invention there would be obtained, after expiration of "T" time, a pattern of charges on the screen giving a "history" of the sonar beams for the last T seconds. If such pattern were visible, and if the average was subtracted from each recorded voltage, the pattern might look something like the pattern of FIG. 2. While that pattern, at first glance, is completely meaningless, there is actually at least one signal buried in the midst of all the noise in that figure, that signal being at constant bearing from the sonar system. The signal can be detected by lifting the drawing and rotating it about a horizontal axis between the hands until the line of sight is nearly parallel to the plane of the drawing. When this is done the individual signals merge together to form a straight line representing the bearing-rate of that particular signal.

The reason one is able to pick the "signal" out of the "noise" is that the eye integrates the individual signal increments along the particular bearing rate. The present invention is designed to perform a similar function electronically, and, unlike the human eye, it is capable of detecting a signal by integration along a curvilinear bearing rate scan.

If the sonar system is on a moving vessel, the system's true bearing will change from time to time. In order that it will be unnecessary for the signal inputs to be precessed across the storage screen as a result of such motion, the sampling frequency from oscillator 17 is passed through a phase shifter 22 driven by a directional gyro 23, before being supplied to the horizontal sawtooth sweep generator 18. Thereby the signal inputs from any particular bearing are recorded along the same vertical line, no matter what the true bearing of the sonar system.

At the opposite side of the screen from the write gun there are located a read gun 203 having a cathode 30 and an erase gun 204 having a cathode 31. The read and erase guns will of course include the usual accelerating and focusing systems (not shown). The deflection plates for the erase gun include vertical plates 32 and 33 and horizontal plates 34 and 35. Plates 33 and 35 are grounded, but plates 32 and 34 are supplied with scanning potentials of the same type as supplied to the write deflection plates 6 and 4, respectively. The horizontal deflection potential supplied to plate 34 is obtained from a saw tooth sweep generator 36 which is controlled by the divider 19. Therefore, the horizontal erase beam sweeps across the screen at the line frequency, rather than the sampling frequency, since it is not necessary to erase each line a number of times.

The vertical deflection plate 32 is supplied with a step wave voltage from generator 20 of the write gun deflection control. It will be noted that the erase vertical deflection is one step ahead of the write vertical deflection, because of the delay circuit 21 connected between generator 20 and the write gun vertical deflection electrode 4. Therefore, the erase beam steps down the storage screen 9 at the same frequency as the write beam, but one line ahead of it, so that the oldest line of data is erased during each line period, one line before the write gun writes on the storage screen 9. The step wave generator 20 must of course supply a voltage which steps down to a minimum level and then increases very rapidly to a maximum level before stepping down once more. Thereby, the latest line of data, called the "now" line is stepped down the tube from the top to the bottom, during the writing sequence, and then returns to the top line for subsequent stepping-down the screen in the next "frame".

The cathode 31 of the erase gun is supplied with a voltage from bias source 31*a* such that the storage screen 9 is much more positive than the cathode, so that the stored charge pattern in each line is discharged and the storage screen 9 brought to a uniform potential along that line, when the erase beam scans the line.

The read cathode 30, however, is supplied with a much lower bias than the erase cathode, so that very little discharge of the dielectric takes place when it is scanned by the read beam. As a matter of fact, the screen is preferably negative with respect to the cathode 30. The read beam is deflection by vertical deflection plate 36 and 37 and horiztontal deflection plates 38 and 39. The plates 36 and 38 are connected together to ground, but the plates 37 and 39 each receive potential from a read track scan generator 40 which develops a series of sweeping potentials in a fashion to be described hereinafter. The read track scan generator 40 is controlled from the step wave generator 20 through connection of the generator 40 through a delay circuit 41 to the output side of the delay circuit 21. The delay circuit 41, like the delay circuit 21, provides a delay of one line period, so that reading always starts at the most-recently-recorded line of record data, the "now" line.

The reading operation takes place by virtually of the control grid-like effect of the storage screen 9 on the read beam. That is, the intensity of the read beam which reaches collector 8 is dependent, at any position of the read "spot," upon the charge on the elemental screen area corresponding to that position. Since that charge is determined by the intensity of the write beam at the time it scanned that spot, the collector current due to the read beam varies instantaneously with the amplitude of the signal input recorded at that position on the storage screen.

In order that the current due to secondary electrons from the write beam cannot mask the read beam current in the collector, the read beam is preferably modulated at an extremely high frequency of the order of 30 Mcs. through a radio frequency modulator 200 coupled to a tuned circuit 42 connected between read cathode 30 and read bias source 43. The read signal is then taken from tuned circuit 11 (tuned to the radio frequency) and appropriately amplified in video amplifier 201, before detection and utilization.

Figure 3:
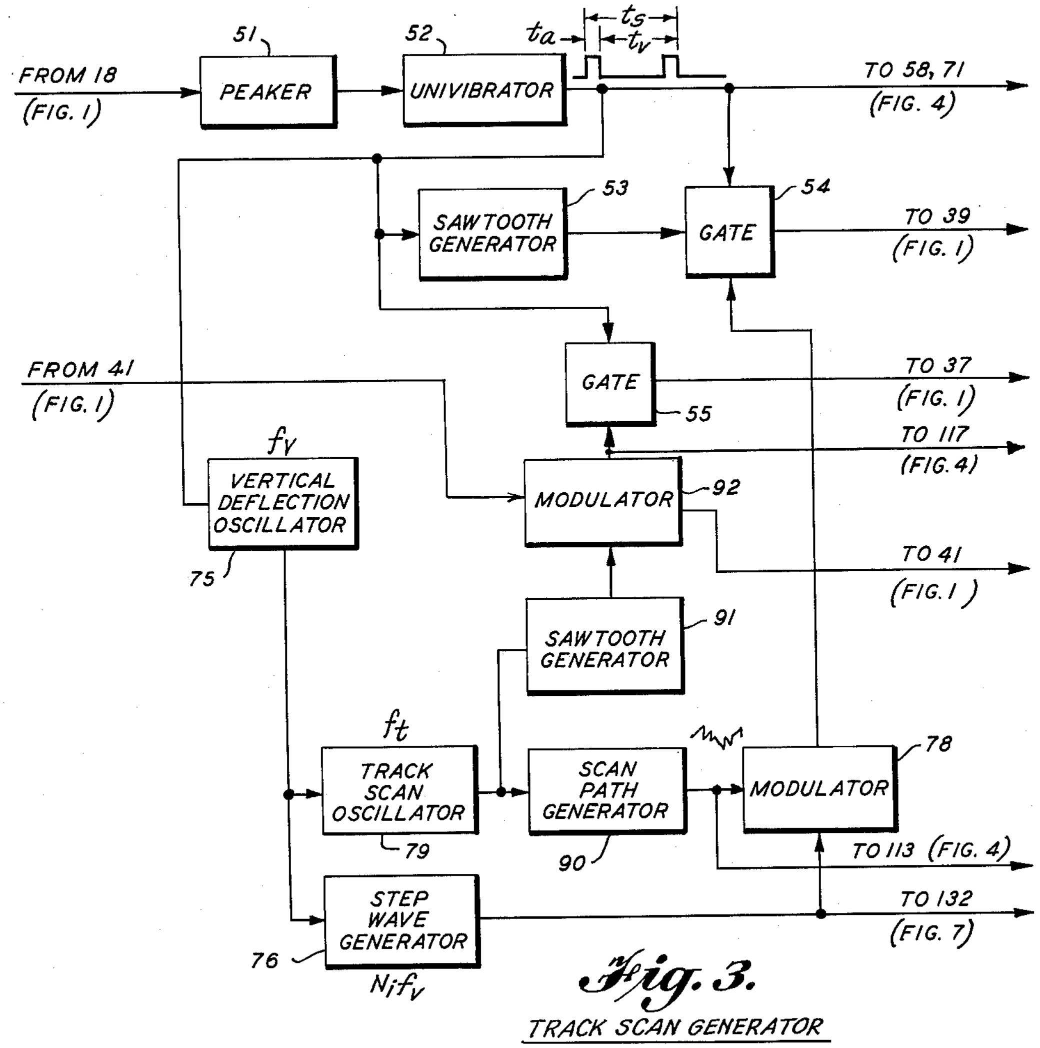
FIG. 3 is a block diagram showing the track scan generator which provides the deflection voltages for the read beam of the intermediate storage device of FIG. 1 to enable the beam to scan along the desired multiplicity of paths.

The read track scan generator 40 of FIG. 1 is shown in detail in FIG. 3. This apparatus develops two different types of sweeps for the read beam of the intermediate storage tube 1. The first type is used during a first portion of each frame to obtain a voltage representative of the average of the stored information, for comparison during the second portion of the frame cycle with a voltage developed from an entirely different type of scan, as will be explained hereinafter. This average scan voltage is representative of the noise voltage and may be obtained by sweeping across the screen along a path unlikely to contain the track of a signal and therefore unlikely to contain more than few signal samples. In the illustrated embodiment, the average scan is made horizontally across the screen at infinite bearing rate. Since no target could even approximate such motion, the integral of the read beam current for such scan constitutes an average or noise voltage.

In order to provide for this scan, the read scan generator 40 includes a peaker 51 to which is supplied the output of the sawtooth generator 18 of FIG. 1. The peaker provides a voltage spike coincident with the "flyback" of the horizontal sawtooth sweep voltage. This spike is in turn used to drive a single shot multivibrator or univibrator 52, which supplies a square wave of duration $t_a$ each time it is turned on by a spike from peaker 51. The time $t_a$ represents a small portion of the sampling period of oscillator 17 of FIG. 1, a time determined by the reciprocal of the product of the sampling frequency and a quantity $(kN_1+1)$, where $k$ represents the number of track scans from each initiation position. Univibrator 52 drives a sawtooth generator 53 which supplies a sawtooth voltage of the duration of the square wave pulse from the univibrator. That sawtooth is supplied to a gate 54 which, when open, supplies the sawtooth to read beam horizontal electrode 39 (FIG. 1).

The output of delay 41 (FIG. 1) is supplied to a similar gate 55 which, when open, supplies the step voltage to vertical read electrode 37 (FIG. 1). Thereby, when gates 54 and 55 are open, the read beam of storage tube 1 is caused to scan across the storage screen 9 along the line which has just been written by the write beam.

Gates 54 and 55 are preferably of the well-known single-pole, double-throw type which are operable during time $t_a$ to connect sawtooth generator 53 to horizontal read beam electrode 39 and delay circuit 41 to vertical read beam electrode 37. During the remainder of each cycle of the scanning frequency, they perform a different function to be hereinafter described.

Figure 4:
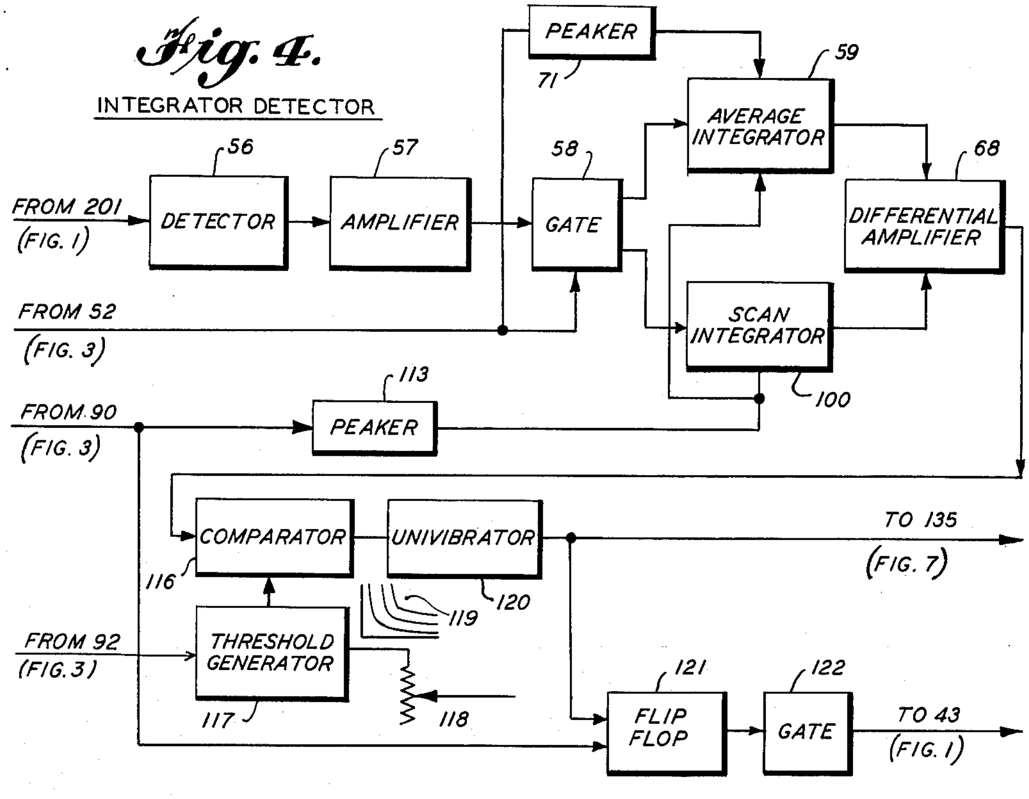
FIG. 4 is a block diagram showing the integrator detector to which the voltages read out of the intermediate tube are supplied.

During this averaging scan, the read beam output is supplied to an averaging integrator through connection of video amplifier 201 (FIG. 1) to detector 56 of FIG. 4. After detection to remove the radio frequency carrier, the read beam output is amplified in amplifier 57 and supplied to a gate 58. That gate, like gates 54 and 55 of FIG. 3, is controlled by the output of univibrator 52 and is open to connect the read beam output to averaging integrator 59, during the duration of the square wave univibrator pulse.

Figure 5:
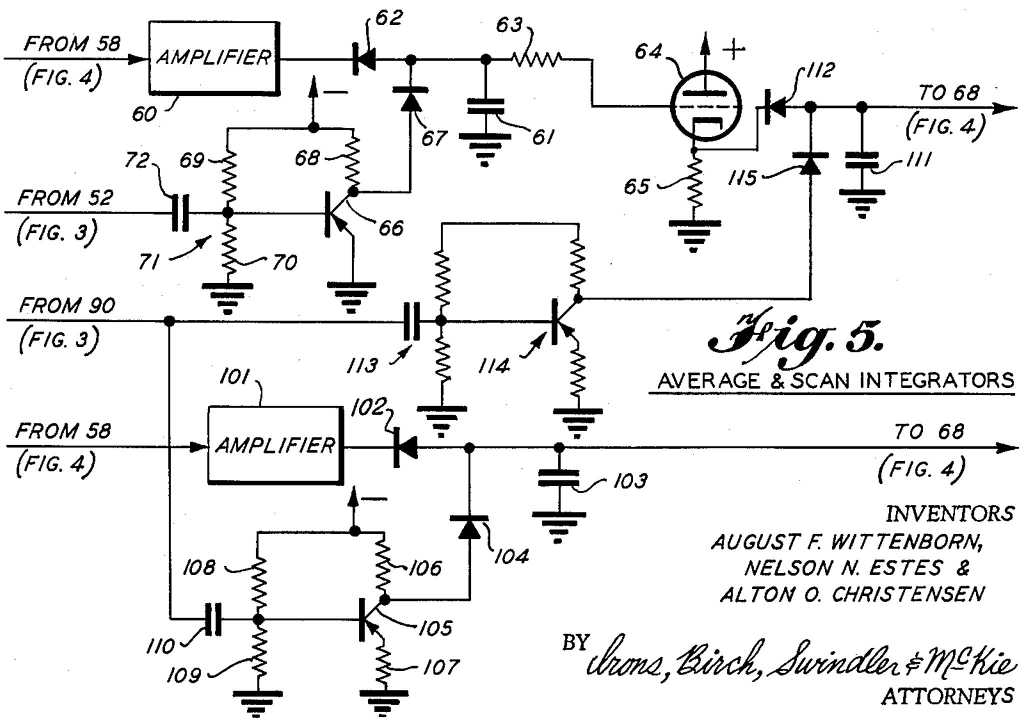
FIG. 5 is a schematic diagram of the average and scan integrators of FIG. 4.

The averaging integrator may be of the type shown in FIG. 5 including an amplifier 60 which receives the read beam output from the gate 58 of FIG. 4. The amplified read beam current charges an integrating capacitor 61 through a diode 62. The diode and capacitor preferably have a time constant of the order of one hundred times the period of the sampling frequency, so that the charge across the capacitor builds up with time during the averaging scan and so, at the end of that scan, represents a voltage proportional to the integrated output of the read beam current during averaging scan time $t_a$.

Capacitor 61 has its ungrounded terminal connected through a resistor 63 to the control grid of triode vacuum tube 64. That tube has its anode connected to a suitable source of positive potential and its cathode connected through a cathode follower resistor 65 to ground. Across that resistor is developed a voltage proportional to the voltage across integrating capacitor 61, and, since the circuit constants are chosen such that the discharge time constant of capacitor 61 is about 1000 times, the period of the sampling frequency, the average voltage across resistor 65 remains quite constant during the remaining part of the sampling frequency period following sampling time $t_a$. In fact, the average voltage degrades by only about one-tenth of one percent during that time.

At the end of each sampling period, it is necessary to discharge integrating capacitor 61 to make ready for a new averaging scan. This is provided for through PNP transistor 66 which has its collector connected through diode 67 to the junction between diode 62 and capacitor 61. The collector is also connected through a resistor 68 to a suitable source of negative potential, while the transistor base is connected to the mid-point of a voltage divider 69–70 across the negative source, and the emitter is grounded. By reason of the negative base bias, discharge transistor 66 is normally non-conducting, but when the univibrator 52 supplies a pulse, that pulse is differentiated in the peaker 71 consisting of capacitor 72 and resistor 70, and the differentiated pulse turns the transistor on. Thereby, the ungrounded end of integrating capacitor 61 is connected to ground through discharge diode 67 and the collector-emitter circuit of the transistor, and the capacitor rapidly discharges toward ground. Thereby the averaging integrator is ready for the next averaging scan.

Referring back to FIG. 3, during the portion of the scanning period when the averaging pulse $t_a$ is not on, the read deflection plates 37 and 39 are connected by gates 55 and 54 to different sweep sources. Those sweep sources provide deflection voltages such that the read beam scans various "tracks" from the most-recently written line of the storage screen. Preferably the tracks scanned include all those along which a signal of interest may be found. In the sonar application referred to above, they would include all those tracks along which a target of interest might have travelled. These tracks could be determined in accordance with the possible speed and position of any interesting target so as to eliminate impossible tracks. The tracks might well, and probably would, include curvilinear tracks but, for simplicity's sake, the apparatus illustrated in the drawings will be described only in conjunction with linear tracks. It will be understood, however, that curvilinear cathode ray sweeps, and apparatus for developing them, are well known in the art and are included within the scope of the invention.

More specifically, the track scan generator 40 is designed to develop scan voltages which will enable the read beam to scan from each of the signal positions on the most-recently-written line on the storage screen 9 (FIG. 1). That is, if there are $N_1$ signal inputs, those inputs by commutating action, will be recorded at $N_1$ positions across each horizontal line. The track scans will then occur from each of these positions along the most-recently-written, or "now" line, and there will be any desired number of such scans from each position or "spot," the scans being of any desired configuration. In the illustrative embodiment of FIG. 6, only five such scans are provided for, again for simplicity's sake.

Since all of these track scans, and the averaging scan, must take place within a single cycle of the oscillator 17 (FIG. 1) the univibrator 52 of FIG. 3, which supplies a pulse of duration $t_a$ (the averaging time duration) during each such cycle, is connected to drive an oscillator 75 which develops a voltage of slightly higher frequency than the master frequency from oscillator 17. That frequency is determined by the product of the master frequency and the ratio of the sum $kN_1+1$ to $kN_1$, where $k$ is the number of track scans from each initiation point on the "now" line, five in the illustrative example.

The output of oscillator 75 is supplied to a step wave generator 76 which is designed to develop a step wave of frequency $N_1$ times the output of oscillator 75. Thereby, a horizontal deflection voltage for the read beam is supplied, which voltage, when the gate 54 is in proper condition, is connected through to read horizontal deflection electrode 39 to step the read beam across the "now" line to the various positions at which the signal inputs are recorded. For instance, if there are 100 signal inputs ($N_1=100$) the step wave generator will develop a wave form of 100 steps during each cycle of oscillator 75.

In order that the read beam can scan the desired number of tracks from each signal input position, the step wave output of generator 76 is combined in a modulator 78 with other wave forms controlled by a track scan oscillator 79. The track scan oscillator 79 is controlled by vertical deflection oscillator 75 but develops an output which is the product of that frequency ($f_v$), the number of signal inputs ($N_1$) and the number of scans ($k$) from each signal position. For instance, if there are to be five track scans from each signal position, the output of oscillator 79 will have a frequency five times the frequency of step wave generator 76.

Figure 6:
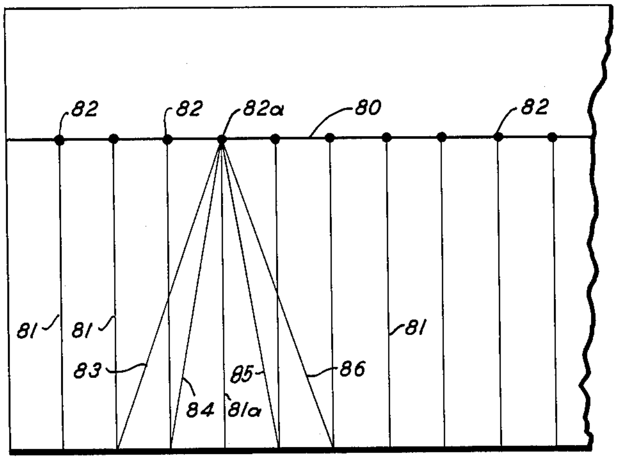
FIG. 6 is a diagrammatic showing of some of the track scans that may advantageously be made with the read beam of the intermediate storage device.

The track scans, as indicated above, may be along any desired paths, but they will include a perpendicular vertical scan to take care of the possibility that the target is at zero bearing rate from the sonar system. They may also include scans inclined at an angle toward the left and toward the right from the initiation point such as to cross, say, two other signal beams, and such as to cross one other signal beam. Referring to FIG. 6 showing diagrammatically some of the possible sweeps from any one of the horizontal "lines" 80 on the screen 9, there will be perpendicularly vertical sweeps 81 from each of the signal storage positions of sweep initiation points 82. There may also be sweeps 83 and 84 at angles to the left from the point 82*a* such that the scans cross two and one other beam, respectively. (Of course, each vertical scan 81 represents one beam, since each bit of information from that signal input, or beam, is stored along that vertical line.) There may also be corresponding scans 85 and 86 to the right from initiation point 82*a*. As indicated, these scans may be curvilinear, but the linear case is chosen for illustration, for simplicity's sake.

The horizontal deflection voltages for scans 81*a* and 83–86 are supplied by a scan path generator 90 (FIG. 3) which is driven by track scan oscillator 79. In the linear case illustrated the generator may include a relatively low frequency sawtooth generator having an output modulated by a high frequency generator, as indicated in the waveform shown at the output of generator 90. The low frequency sawtooth would be of the frequency of step wave generator 76, while the high frequency sawtooth would be at track scan oscillator frequency.

The output of scan path generator 90 is combined with the step wave from generator 76 in modulator 78 and supplied to gate 54. As indicated above, the gate is in condition to connect the modulator output to read horizontal deflection plate 39 except during the pulse from univibrator 52, the length of the average scan.

The vertical deflection voltage for the track scans is of course a simple sawtooth, supplied by sawtooth generator 91 which is cycled by track scan oscillator 79. However, the scans must always be from the most-recently-recorded line of information, the "now line," so that the sawtooth from generator 91 is combined with the step wave from delay circuit 41 (FIG. 1) in modulator 92 before being gated through gate 55 to read vertical deflection plate 37.

Each time that the read beam is deflected along one of its tracks by the track scan generator 40, the read beam output varies with instantaneous amplitude of the voltages recorded in the various signal positions along the track being scanned. After detection in detector 56 (FIG. 4) and amplification in amplifier 57, the varying voltage is supplied to gate 58. Except during the averaging time, the gate 58 supplies its output to scan integrator 100. That integrator is shown in greater detail in FIG. 5 and includes an amplifier 101 whose output is connected through a diode rectifier 102 and a capacitor 103 to ground. The capacitor integrates the signal input during each track scan and therefore develops a gradually increasing voltage during that scan. The charging time constant of the R-C integrator circuit is preferably chosen to be about 100 times the period of each track scan. At the end of each track scan the capacitor 103 is rapidly discharged through a diode 104 having one of its terminals connected to the junction between the capacitor and diode 102 and its other terminal connected to the collector of a PNP transistor 105. The collector is also connected through resistor 106 to a suitable source of negative potential, while the emitter is connected through resistor 107 to ground. The transistor base is sutiably biased to cut-off by a voltage divider including resistors 108 and 109 connected between the negative source and ground. The base is also connected through capacitor 110 to scan path generator 90 of the track scan generator (FIG. 3) and the capacitor and resistor 109 to operate to differentiate the flyback of each track scan voltage to supply a positive pulse to the base of the transistor and turn the transistor on a flyback time. With the transistor 105 on, storage capacitor 103 discharges in preparation for a new track scan integration cycle.

The storage capacitor 103 is connected across one input of differential amplifier 68 where it is compared with the average voltage obtained during the first portion $t_a$ of each cycle of the sampling oscillator 17 (FIG. 1). However, for effective comparison, the average voltage to be compared cannot be a D.-D. voltage such as is developed across the cathode resistor 65 (FIG. 5) but must also increase exponentially, like the integrated signal voltage. In order to provide the proper comparison voltage, the average voltage across resistor 65 is caused to charge up an integrating capacitor 111 through a diode rectifier 112. The charging time constant of this integrating circuit is identical to that of the scan integrator, so that the voltage across capacitors 103 and 111 build up in each track scan in the same manner.

Integrating capacitor 111 must of course be discharged like capacitor 103, at the end of each track scan, and an identical peaker 113, discharge amplifier 114 and diode rectifier 115 is used for this purpose. The peaker 113 is driven by the scan path generator 90.

The integrated average voltage across capacitor 111 is continuously compared with the integrated track scan voltage across capacitor 103 in differential amplifier 68 and a voltage representative of the difference between them is supplied to a comparator 116 (FIG. 4).

That comparator may be of the type disclosed in an application of Henry B. Patterson, Jr., S.N. 846,867, filed October 16, 1959, entitled, "Signal Comparator," and assigned to the same assignee as the present invention. The comparator is capable of comparing two opposite polarity currents or voltages and developing an output pulse when one of the signals is the larger. The output of the differential amplifier 68 is compared with the output of a threshold function generator 117 which develops a voltage varying with time as indicated adjacent the threshold generator in FIG. 4. That is, the threshold voltage amplitude is initially quite large and decreases exponentially with time to become assymptotic with respect to some average voltage. Any one of the curves shown adjacent to the threshold function generator may be selected by the control shown schematically at 118 to select the instantaneous amplitude of the threshold voltage throughout the comparison cycle.

The purpose of the threshold function generator is to provide that the widely-varying voltages at the beginning of integration times which may be due to noise, as well as to the presence of the signal, are not detected, but that substantial changes in voltage later in the integration cycle, which are probably due to a signal, rather than to noise, are detected. Referring to FIG. 4, the output of the differential amplifier is shown as compared with the function generator output and at a point identified by the numeral 119 it is seen that the amplifier output exceeds the level of the threshold voltage. At that time, the comparator 116 develops a pulse of voltage which is supplied to a univibrator 120 to develop a gate voltage. This voltage gate is supplied to the cathode of a display storage tube, to be hereinafter described, and is also used for other functions in the system.

The threshold function generator of course must be cycled during each one of the sweeps of the read beam during this second portion of the frame cycle. This is accomplished by connection of the threshold generator to the output of the modulator 92 of the track scan generator of FIG. 3.

When a detection such as indicated at 118 in FIG. 4 occurs, it is no longer necessary to continue integration, since a very important feature of this invention is that integration time is long enough or good enough for detection (if a signal is present and the threshold level is low enough to allow its detection), but integration time is not too long, such as to allow the signal to be completely masked by noise. The next track scan could therefore be initiated upon occurrence of a detection, but this would needlessly complicate the system, so the scan is allowed to continue to its end and the read beam is merely turned off. This is effected through a flip flop 121 which is turned on by univibrator 120. The flip flop actuates a gate 122 which supplies a bias to read beam cathode 30 (FIG. 1) to turn the beam off. The flip flop 121 is reset by the scan path generator 90 during flyback, so that the read beam is ready for the next track scan when that begins.

It will be apparent that the signal detection may in fact be a false detection if a noise voltage at the time of the detection is sufficiently large to exceed the threshold from the function generator 117. In order to avoid this, or to check whether the detection represents noise voltage, the control 118 may be varied to increase the threshold voltage, thus putting the output of the function generator along a different curve. The number of false alarms may occur by erroneous signal detections therefore is controlled by the setting of the control 118.

Figure 7:
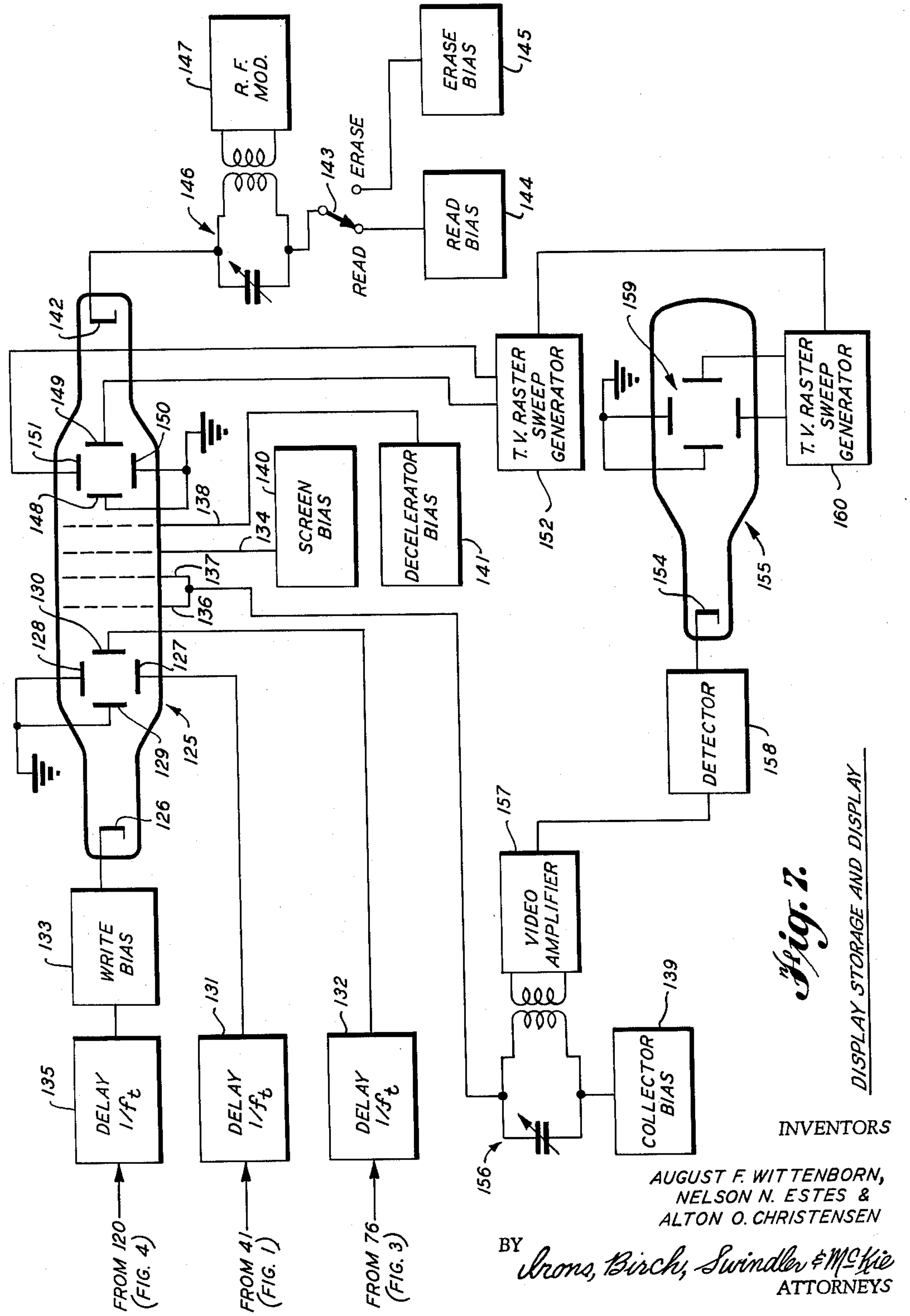
FIG. 7 is a block diagram of the display storage device and display apparatus to which the integrator detector of FIG. 4 is connected, to provide for indication of detections that occur during the various track scans; and, FIG. 8 is a diagrammatic showing of various tracks that might appear on the display device of FIG. 7.

It was indicated above that the output of the univibrator 120 was supplied to the cathode of a display storage tube. Referring now to FIG. 7, this storage tube, identified therein as 125, may be of generally the same type as used for intermediate storage and identified by the numeral 1 (FIG. 1). The tube may include a write gun having a cathode 126 which receives the univibrator pulse, and a write electrostatic deflection system including vertical deflection plates 127 and 128 and horizontal deflection plates 129 and 130. Plates 128 and 129 are connected together to ground. The ungrounded vertical deflection plate 127 is connected to delay circuit 41 (FIG. 1) through a further delay circuit 131 designed to delay the read beam vertical deflection voltage by one cycle of the track scan oscillator 79. The ungrounded horizontal deflection plate is connected to step wave generator 76 (FIG. 3) through a delay circuit 132 which delays the horizontal deflection voltage setting the track scan initiation point, by one cycle of the track scan oscillator.

With this combination of deflection voltages the write beam of storage tube 125 is deflected to positions corresponding to the various signal positions of the read beam of storage tube 1, but is always one track scan behind the said read beam. However, the cathode 126 of the storage tube is normally biassed off by the bias circuit 133, so that the write spot does not store a voltage on screen 134. The output of univibrator 120 (FIG. 4) is connected through a delay circuit 135 of period corresponding to one cycle of the track scan oscillator voltage to the bias circuit 133 and is operable, when a "detection" has caused the univibrator to develop a pulse, to turn the write beam on, but only after a delay of one track scan period. Thereby a "spot" is written on the screen at the initiation point of a scan during which a detection occurs.

It may be desired to write a greater portion of the track scan than the mere initiation point when a detection occurs. In such case there may be sweep regenerators connected to the horizontal and vertical deflection plates 130 and 127 operable to supply scan voltages representative of the desired portion of the scan.

The storage tube 125 of course includes write decelerator electrode 136, collector electrode 137 and read decelerator electrode 138. The write decelerator and collector electrode are connected together and suitably biassed by bias source 139, while the screen and read decelerator electrodes are suitably biased by respective sources 140 and 141.

It is unnecessary that the storage tube 125 employ separate read and erase guns so the single gun including cathode 142 is employed for both functions. A switch 143 connects the cathode 142 to the desired one of the read and erase bias sources 144 and 145 through tuned circuit 146. The tuned circuit introduces an appropriate carrier frequency into the system through radio frequency modulator 147 for the same purpose as in the storage tube 1 (FIG. 1).

Figure 8:
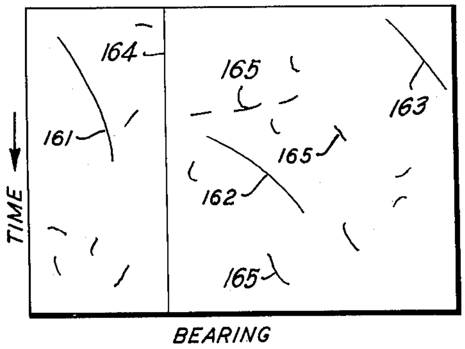

The read-erase gun of storage tube 125 includes horizontal deflection plates 148 and 149 and vertical deflection plates 150 and 151. Plates 148 and 150 are grounded, while plates 149 and 151 are counnected to a suitable television raster-type sweep generator 152. When the switch 143 is in its "read" position, the read beam is thereby caused to scan the screen 134 in raster fashion, completely independently of the writing function of tube 125. To allow appropriate display of the detections stored in display storape tube 125, the collector output from the raster scan is supplied to the cathode 154 of a conventional cathode ray oscilloscope 155, through tuned circuit 156, video amplifier 157 and detector 158. The oscilloscope is provided with a suitable deflection system 159 controlled by a television raster-type sweep generator 160. Sweep generators 152 and 160 are synchronized together, so that the position of the cathode ray spot corresponds at every instant to the position of the read spot of display storage tube 125. Thereby, there may be obtained on the display tube screen a representation of the type shown in FIG. 8 wherein the tracks 161–165 represent the tracks of various detections. The tracks 165 represent probable "false alarms" and could be eliminated by setting the threshold control 118 (FIG. 4) at a higher level. However, setting the threshold control at such higher level may also eliminate probable target tracks such as those at 161–164. The operator may desirably vary the threshold level and determine whether the tracks shown for any level include all likely target tracks, the target tracks in which he is interested at any particular time, or too many probable false tracks. Whenever he wishes to, he may erase the voltages stored on screen 134 of the storage tube 125 (FIG. 7) by movement of switch 143 to its erase position. The apparatus may also be appropriately provided with circuits to allow erasure of selected ones of the tracks on the display tube 155 or on the screen of the display storage tube, so that the operator may eliminate any tracks corresponding to targets which he has identified in which he is no longer interested. The most recent position of any target will of course be indicated by the intensity of the representation, since the voltages stored on the screen of the storage tube 125 will decay with time and the voltages read from the screen by the read beam will accordingly be less for lines corresponding to the older stored data.

It will be evident that several additional "repeater" oscilloscopes could be controlled from the display storage tube 125 and that different types of display than that provided for in the apparatus of FIG. 7 could be used.

In operation of the method and apparatus described herein, each of the variable input voltages $N_i$ is recorded along a channel of a reproducible recording medium, the storage screen 9 of intermediate storage tube 1. The inputs contain both signals and noise such that the signals are buried in the inputs, and the latter are recorded spaced apart along the horizontal dimension of the screen, through the action of commutator 15 in conjunction with the horizontal sweep provided by sawtooth generator 18. The frequency of this sawtooth sweep is an integral multiple of the frequency of step wave generator 20, so that, after each line is recorded (over and over again in the illustrative embodiment, though it may only be recorded once), the write beam moves down one line and the time-varying signal inputs are recorded on the next-lower line. This operation continues with the write beam sequentially stepping down the storage screen until the lowest line is completed whereupon the write beam steps back to the top line and begins again its step-wise progression down the screen. The erase beam is kept one step ahead of the write beam through the operation of delay circuit 21, so that each line is erased (its small capacitors discharged) before the line is written upon. With this arrangement, the most-recently recorded, or "now" line continuously moves down the tube. However, circuits could be arranged to precess the stored data down the screen, as each new line is written, so that the "now" line could remain stationary.

Scanning or reading of the voltages recorded on screen 9 occurs in two separate steps. In the first step, the read beam is caused to sweep or scan a path which is unlikely to contain the track of a signal with respect to the independent variable, described as time. In the illustrated embodiment this path is along one horizontal line of recorded voltages, since no target could possibly have an infinite bearing rate with respect to the detection apparatus, yet a "line" path represents such a rate. This horizontal scan is along the most-recently-recorded line by reason of supply of the step vertical deflection voltage of generator 20, delayed by both of delay circuits 21 and 41, through gate 55 (then controlled by the averaging pulse from univibrator 52) to vertical read deflection electrode 37. The necessary sawtooth for the horizontal scan is supplied by generator 53 through gate 54 (also under control of the averaging pulse) to the horizontal read deflection electrode.

During this horizontal averaging scan, the read beam output is developed in collector 8, amplified and then detected, amplified once more and gated by gate 58 (also under the control of the averaging pulse) to the averaging integrator 59. There an average voltage is built up and stored for use during the next portion of each "line" cycle.

After the averaging pulse from univibrator 52 drops off, the track scans follow. A plurality of such scans are sequentially made from the most-recently-recorded position in each input voltage channel. These scans are developed by the track scan generator 40 and may be of the type illustrated in FIG. 6, though they may also be more complicated. During each scan, the reproduced varying voltage read by the scanning beam is integrated in scan integrator 100 simultaneously with integration of the average voltage in average integrator 59. The two integrating circuits have identical time constants so that the average noise voltage may be subtracted from the composite voltage in differential amplifier 68 to remove the effect of the average noise. The difference voltage is then compared with a threshold voltage in comparator 116. This threshold voltage is caused to decrease with time in order to make it more difficult for a noise peak to cause a "detection" during the initial part of the scan when its effect upon the integrated voltage will be greater than later in the scan.

Whenever the difference voltage from differential amplifier 68 exceeds the threshold voltage from generator 117, the comparator develops a pulse of voltage which keys the univibrator 120. When univibrator 120 is turned on, it supplies an "on" pulse to the cathode of the write gun of display storage tube 125 to turn on the write beam and record a display voltage. It also gates through a blanking pulse to the read beam cathode of the intermediate storage tube 1 to stop integration of the read beam voltage.

The display voltage is recorded on screen 134 of display storage tube 125 at a position corresponding to the initiation point of the scan during which the detection occurs, rather than at a position corresponding to the location of the read beam at the time of detection. This is accomplished through synchronization of the write beam of the display storage tube with the line and signal storage position of the write beam of intermediate storage tube 1 through delay circuits 131 and 132, and by delaying the "on" pulse to the cathode 126 by the same amount, the length of one track scan period.

The number of display voltages recorded on the reproducible recording medium represented by screen 134 is controlled by the setting of the threshold level control 118. If the level is set low, there will be more detections and more "false alarms" representing detections of noise, rather than of signals. If the level is set high, there will be fewer detections and some of the actual signal tracks may not be stored on screen 134. The operator may appropriately adjust the level as desired to eliminate false alarms but yet to cause display of all target tracks or as many target tracks as possible. A skilled operator will observe a track for a period of time and from its configuration determine whether or not it is a false alarm. Then he may adjust the threshold voltage to eliminate it or not, as seems desirable. During such adjustment operations he may erase the display voltages from the screen through operation of switch 143 to the erase position to appropriately bias the cathode 142 with respect to the screen such that all the voltages stored on the screen are erased.

As indicated hereinabove, the detections represented by the display voltages stored on screen 134 may be displayed on one or more cathode ray indicators through a television raster-type deflection of the read beam of storage tube 125 and synchronized deflection of the spots of the indicators while their spots are intensity-modulated by the read beam signals.

The apparatus of the drawings has been described as applied to a passive sonar system, but it will be evident that it could as well be used with an active system (one including a source of ultrasonic pulses which are directed toward and reflected from remote targets). In fact, the invention could as well be used in a radar or infrared detection system. It will be evident that the invention is not in fact limited to an object detection system at all, and specifically that it has utility in correlation systems in which neither bearing nor even time is an essential criterion. It is particularly advantageous for applications in which signals are buried in noise voltages such that it is necessary to integrate the voltages in order to "dig" the signals out from the noise, but in which the optimum integration time is not known. As indicated above, integration in the present system continues until a detection occurs and then stops, an integration time that is "good enough" but which will vary from scan to scan.

As with the electrostatic storage tubes, the cathode ray oscilloscope display could be provided with circuits such that the most-recently recorded display voltages would remain stationary on the tube, rather than step down its face, but the complexity of such circuitry makes it undesirable to illustrate it herein.

Though electrostatic storage is described specifically herein, any type of storage which permits scanning for integration may be employed. Specifically, magnetic core or drum storage is contemplated and may be used in place of electrostatic storage. Many other changes may be made in components of the illustrated system by the skilled engineer, dependent upon the particular application for which the system is designed. Accordingly, the invention is not to be considered limited to the embodiment described herein but rather only by the scope of the appended claims.

We claim:

1. The method of detecting a signal buried in a variable input voltage which comprises the steps of recording the input voltage along lines extending along one dimension of a first reproducible record medium and channels extending along another dimension thereof, scanning the first record medium sequentially along each of a plurality of paths to reproduce the recorded input voltage, at least some of said scans being along different channels of the first record medium, integrating the reproduced voltage during each of such scans, providing an indication whenever the integrated reproduced voltage exceeds a predetermined reference level, the indication being related to the scan path during which the indication was produced, recording a display voltage on a second reproducible record medium at a position related to the scan path during which the integrated reproduced voltage exceeds the comparison voltage, scanning the second record medium in raster fashion to derive a television-type signal, and displaying the television-type signal on a cathode ray oscilloscope.

2. The method of detecting a signal buried in a variable input voltage which comprises the steps of recording the input voltage along lines extending along one dimension of a reproducible record medium and channels extending along another dimension thereof, scanning the record medium along a path unlikely to contain the track of a signal to obtain a first variable voltage instantaneously proportional to the voltage recorded along that path, integrating said first variable voltage during such scanning to obtain an average voltage, scanning the record medium sequentially along a plurality of paths likely to contain the track of a signal to obtain a second variable voltage, at least some of such second-mentioned scans being along different channels of the record medium, integrating said second variable voltage while simultaneously integrating the average voltage during each of such second-mentioned scans, comparing the two integrated voltages to obtain a difference voltage, generating a threshold voltage which decreases with time during each of such second-mentioned scans, subtracting the difference voltage from the threshold voltage, and providing an indication when the difference voltage exceeds the threshold voltage.

3. The method of claim 2 in which said indication-providing step includes the steps of recording a display voltage on a second reproducible record medium at a position related to the scan path during which the difference voltage exceeds the threshold voltage, scanning the second record medium in raster fashion to derive a television-type signal, and displaying the television-type signal on a cathode ray oscilloscope.

4. The method of claim 3 in which integration of said second variable voltage is stopped for the duration of the scan each time that the difference voltage exceeds the threshold voltage during that scan.

5. The method of detecting signals buried in a plurality of variable input voltages which comprises the steps of recording the input voltages in channels spaced apart along one dimension of a reproducible record medium as a function of an independent variable along another dimension thereof, scanning the record medium along a path unlikely to contain the track of a signal to obtain a first variable voltage, integrating said first variable voltage during such scanning to obtain an average voltage, scanning the record medium sequentially along a plurality of angularly-related paths likely to contain the track of a signal as a function of the independent variable to obtain a second variable voltage, integrating said second variable voltage during each scan while simultaneously integrating the average voltage, comparing the two integrated voltages to obtain a difference voltage, generating a threshold voltage which decreases with time, subtracting the threshold voltage from the difference voltage, and providing an indication when the difference voltage exceeds the threshold voltage.

6. The method of claim 5 in which each of said angularly-related scans are from initiation points along the most-recently recorded line of input voltages.

7. The method of detecting signals buried in a plurality of variable input voltages which comprises the steps of recording the input voltages in channels spaced apart along one dimension of a reproducible record medium as a function of time extending along the perpendicular dimension, scanning the record medium along a path unlikely to contain the track of a signal to obtain a first variable voltage, integrating said first variable voltage to obtain an average voltage, sequentially scanning the record medium along a plurality of angularly-related paths from each of the most-recently recorded positions in each of the channels to obtain a second variable voltage, each of said scans being directed along a path likely to contain the track of a signal as a function of time, integrating the said second variable voltage dureach scan, while simultaneously integrating the average voltage, in circuits of the same time constants, continuously comparing the two integrated voltages to obtain a difference voltage, generating a threshold voltage which decreases with time in an exponential fashion, subtracting the threshold voltage from the difference voltage, providing an indication when the difference voltage exceeds the threshold voltage, and terminating said simultaneous integration, whenever such an indication is made, until the next scan.

8. The method of claim 7 in which said indication-providing step includes the steps of recording a display voltage along one dimension of a reproducible record medium at a position corresponding to the initiation point of a scan whenever the difference voltage exceeds the comparison voltage at any time during the scan, and visually indicating the position of each such recorded display voltage.

9. The method of detecting signals buried in a plurality of input voltages varying with time which comprises the steps of sequentially recording the respective input voltages spaced apart along successive lines of an electrostatic storage screen such that each input voltage is stored in a separate channel extending perpendicular to said lines, erasing each line on the screen just prior to recording a new line of information; during each line period: first, scanning along the most-recently recorded line with a cathode ray read beam to obtain a first variable voltage, integrating said first voltage during the scan to obtain an average voltage, then sequentially scanning the screen with the read beam along a plurality of angularly-related paths from each channel position on the most-recently recorded line to obtain a second variable voltage, each of said second-mentioned scans being directed along a path likely to contain the path of a signal as a function of time, integrating said second voltage while simultaneously integrating the average voltage in circuits of the same time constants, continuously comparing the two integrated voltages to obtain a difference voltage, generating a threshold voltage which decreases with time in an exponential manner during each scan, subtracting the difference voltage from the threshold voltage, providing an indication when the difference voltage exceeds the threshold voltage, and terminating said simultaneous integration whenever an indication is made, until the next scan.

10. The method of claim 9 in which said indication-providing step includes the steps of recording a display voltage at a position on a second electrostatic storage screen corresponding to the initiation point of a track scan whenever the difference voltage exceeds the threshold voltage during that scan, scanning the second screen in raster fashion with a cathode ray read beam to derive a television-type signal, and displaying the television-type signal on a cathode ray oscilloscope.

11. The method of claim 10 in which the input voltages are rectified passive sonar signals and the lines of the screens correspond to bearing with respect to the sonar transducers.

12. The method of indicating the presence of a target as a function of bearing rate with respect to a detecting station which includes the steps of developing a plurality of unidirectional voltages representing the presence of both targets and noise at different bearings from the station, storing said input voltages as functions of bearing and time, scanning said stored voltages at a bearing rate much larger than possible for any likely target to supply a first output instantaneously representative of the stored voltages, integrating said first output during the scan to provide an average voltage indicative of noise level, then scanning said stored voltages sequentially over a plurality of different paths representing possible target bearing-rates to obtain a second output instantaneously representative of the amplitude of combined target and noise voltages along the tracks of such scans, simultaneously integrating said average voltage and said second output during each track scan, continuously comparing the integrated average voltage and the integrated second output to obtain a difference voltage, generating a threshold voltage which decreases with time during each track scan, subtracting the difference voltage from the threshold voltage and providing an indication as a function of bearing whenever the difference voltage exceeds the threshold voltage.

13. Correlating apparatus for operation upon a variable input voltage which has a signal buried therein comprising, a reproducible record medium, means for recording the input voltage along lines extending along one dimension of the record medium and in channels extending along another dimension thereof, means for reproducing voltages recorded on said record medium, means for causing said reproducing means to scan a plurality of paths along said record medium, at least some of said scans being along different channels of the record medium, means deriving a voltage indicative of the average recorded voltage, means for simultaneously integrating said reproduced voltages and such average voltage during each of said scans, means for continuously comparing the two integrated voltages to provide a difference voltage, means for developing a threshold voltage which decreases with time during each of said scans, means for subtracting said difference voltage from said threshold voltage, and means for providing an indication whenever said difference voltage exceeds said threshold voltage, said indication-providing means being operable to relate such indication to the scan path during which it was produced.

14. The apparatus of claim 13 in which said indication-producing means includes a second reproducible record medium having lines and channels extending along different dimensions thereof, means for recording a display voltage at a position along said lines and channels related to the scan path during which said difference voltage exceeds said threshold voltage each time such action occurs, means for scanning said second record medium in raster fashion to reproduce such display voltages, a display cathode ray oscilloscope, means supplying such reproduced display voltages to the beam intensity-controlling elements of said oscilloscope, and means for synchronizing the sweep of the beam of said oscilloscope with the scanning of said second record medium.

15. The apparatus of claim 14 in which each of said record mediums is an electrostatic storage tube.

16. The apparatus of claim 15 including means for erasing the voltages stored on the screen of each of said storage tubes.

17. Correlating apparatus for operation upon a plurality of variable input voltages including a reproducible record medium, means for writing on, reading from and erasing voltages from said medium, means connected to said writing means for causing writing to scan the record medium at a relatively slow rate along one dimension of the medium and at a faster rate which is an integral multiple of said slow rate along lines extending along a second dimension thereof, means connected to said erasing means for causing erasing to scan the same paths as writing but one line ahead thereof, so that each line is erased immediately before it is recorded upon, means for successively connecting said input voltages to said writing means during each scan along said lines, means connected to said reading means for causing reading to scan along a plurality of angularly-related paths from each position in which an input voltage is recorded along the most-recently recorded one of said lines, said reading means being operable to reproduce the voltages recorded on said medium by said writing means, means for integrating the output voltage from said reading means during the reading scan along each of said angularly-related paths, and means for providing an indication whenever the output of said integrating means exceeds a predetermined threshold level.

18. Apparatus for detecting signals buried in a plurality of variable input voltages including an electrostatic storage tube having a screen and write, read and erase gun systems for directing cathode ray beams toward said screen, means for deflecting the write beam at a relatively slow rate along one dimension of said screen and at a faster rate, which is an integral multiple of said slow rate, along lines extending along a second screen dimension, commutating means for successively connecting the input voltages to one of the control grid and cathode of the write gun during each deflection along said one dimension to vary the intensity of the write beam with variation of the input voltage, means for deflecting the erase beam along the same paths as the write beam but one line advanced from the write beam sweep so that each screen line is erased before input voltages are recorded thereon, means synchronized with the write beam sweep but delayed with respect thereto to deflect the read beam along a plurality of angularly-related paths from each voltage recording position on the most-recently recorded screen line, means for integrating the read beam output during each such deflection to obtain a gradually increasing voltage, and means for providing an indication whenever said increasing voltage exceeds a predetermined threshold level.

19. The apparatus of claim 18 including means for developing a voltage indicative of the average of the voltages recorded on said record medium, second integrating means of identical time constant to said first-mentioned integrating means for integrating such average voltage during each such deflection, means for comparing the two integrated voltages to obtain a difference voltage, a threshold generator for developing a threshold voltage which decreases with time during each such deflection, means for subtracting said difference voltage from said threshold voltage operable to supply a pulse of voltage whenever the difference voltage exceeds the threshold voltage, and means for displaying each such pulse of voltage of a function of the deflection during which it occurred.

20. The apparatus of claim 19 including means connecting said pulse of voltage to the intensity-controlling elements of said read beam to turn the beam off whenever a pulse occurs, for the remaining portion of the deflection.

21.The apparatus of claim 18 in which said first-named means includes a master oscillator, a sawtooth generator driven by the master oscillator, horizontal deflection means supplied with the output of the master oscillator, a divider supplied with the master oscillator output for supplying a lower frequency voltage of frequency determined by the ratio of the number of lines on the tube screen to the total time of input voltage to be recorded on the screen at any one time, a step wave generator connected to the output of said divider, means connected to the output of said divider for delaying the step wave by one cycle of the master oscillator frequency, and vertical deflection means supplied with the output of said delaying means.

22. The apparatus of claim 21 in which said third-mentioned means includes a second sawtooth generator connected to the output of said divider, horizontal deflection means connected to the output of said second sawtooth generator, and vertical deflection means connected to the output of said step wave generator.

23. The apparatus of claim 22 in which said fourth-mentioned means includes a track scan generator, horizontal and vertical deflection means connected to the track scan generator, and second means for delaying a voltage by one cycle of the master oscillator frequency connected between said first-mentioned delaying means and said track scan generator.

24. Apparatus for detecting signals buried in a plurality of variable input voltages including an electrostatic storage tube having a screen and write, read and erase gun systems for directing cathode ray beams toward said screen, means for deflecting the write beam at a relatively slow rate along one dimension of said screen and at a faster rate along a second screen dimension, commutating means for successively connecting the input voltages to one of the cathode and control grid of the write gun during each deflection along said one dimension to vary the intensity of the write beam with variation of the input voltages, means for deflecting the erase beam along the same paths as the write beam but one line advanced from the write beam sweep so that each screen line is erased before input voltages are recorded thereon, means synchronized with the write beam sweep but delayed with respect thereto to deflect the read beam along a plurality of paths from the most-recently-recorded screen line, said synchronized means including a track scan generator operable during each sweep of the write beam along said second screen dimension: initially, to deflect the read beam along a path unlikely to contain a signal track; then, to deflect the read beam along a plurality of angularly-related paths from each voltage recording position on the most-recently recorded screen line; first integrating means operable during such initial deflection of the read beam to integrate and store the read beam output to form an average voltage, second and third integrating means of identical time constants operable during each of such angularly-related deflections to respectively integrate said average voltage and the concurrently-produced read beam output, means for comparing the two integrated voltages to form a difference voltage, a threshold generator operable during each of such angularly-related deflections to generate a deflection voltage which decreases with time, means for subtracting said difference voltage from said threshold voltage, and means for providing an indication whenever the difference voltage exceeds the threshold voltage.

25. The apparatus of claim 24 in which said indication-providing means includes a second electrostatic storage tube having a screen and write and read gun systems, means connected to said track scan generator operable to synchronize the scans of the write beam of said second tube with the scans of the read beam of said first tube so that the two beams scan corresponding lines of the two screens at the same time, means connected to said subtracting means operable to turn the normally-off write beam of the second tube on when said difference voltage exceeds said threshold voltage to record display voltages on the screen of said second tube, means for deflecting the read beam of said second tube in raster-fashion, a display cathode ray oscilloscope, means connected to said last-mentioned means for causing the oscilloscope spot to sweep synchronously with the read beam of said second tube, and means connecting the read beam output of said second tube to the intensity-controlling elements of said oscilloscope to turn the spot on only when such read beam scans a recorded display voltage.

26. The apparatus of claim 25 in which said threshold generator develops a voltage which decreases exponentially with time, in which said subtracting means is a comparator which develops a pulse of voltage whenever the difference voltage exceeds the threshold voltage, and in which said pulse of voltage is supplied to the intensity controlling elements of the read gun of said first storage tube to turn off the read beam and thus stop integration for the remainder of any scan during which the difference voltage exceeds the threshold voltage.

27. The apparatus of claim 26 including means for erasing the display voltages stored on said screen of the second storage tube, and means for adjusting the amplitude of said threshold voltage.

28. The apparatus of claim 26 in which said track scan generator is operable to develop first deflection voltages for deflecting the read beam of the first-mentioned storage tube in synchronous fashion with the write beam deflections and to develop second deflection voltages for deflecting the read beam along paths extending from the most recently-recorded line, said means connected to the track scan generator being supplied with said first deflection voltages so that said display voltages are recorded along the line of said second storage tube corresponding to the most recently-recorded line of said first storage tube.

29. The method of detecting signals buried in an input voltage which comprises the steps of recording the input voltage in channels spaced apart along one dimension of a reproducible record medium as a function of an independent variable along another dimension thereof, scanning the record medium along a path unlikely to contain the track of a signal to obtain a first variable voltage, integrating said first variable voltage during such scanning to obtain an average voltage, scanning the record medium sequentially along each of a plurality of paths extending at least along each of said channels to obtain a second variable voltage, integrating said second variable voltage during each scan while simultaneously integrating the average voltage, comparing the two integrated voltages to obtain a difference voltage, generating a threshold voltage which decreases with time, subtracting the threshold voltage from the difference voltage, and providing an indication when the difference voltage exceeds the threshold voltage.

30. The method of detecting signals buried in a variable input voltage which comprises the steps of recording the input voltage in channels spaced apart along one dimension of a reproducible record medium as a function of time extending along the perpendicular dimension, scanning the record medium along said one dimension thereof to obtain a first variable voltage, integrating said first variable voltage to obtain an average voltage, sequentially scanning the record medium along a plurality of paths including at least each of said channels to obtain a second variable voltage, integrating said second variable voltage during each scan, while simultaneously integrating the average voltage, in circuits of the same time constants, continuously comparing the two integrated voltages to obtain a difference voltage, generating a threshold voltage which decreases with time in an exponential fashion, subtracting the threshold voltage from the difference voltage, providing an indication when the difference voltage exceeds the threshold voltage, and terminating said simultaneous integration, whenever such an indication is made, until the next scan.

31. The method of claim 30 in which said indication-providing step includes the steps of recording a display voltage along one dimension of a reproducible record medium at a position corresponding to the initiation point of a scan whenever the difference voltage exceeds the comparison voltage at any time during the scan, and visually indicating the position of each such recorded display voltage.

32. Correlating apparatus for operation upon a variable input voltage including a reproducible record medium, means for writing on, reading from and erasing voltages from said medium, means connected to said writing means for causing writing to scan the record medium along each of a plurality of channels extending along one dimension of the medium and spaced apart along another dimension thereof, means for connecting said input voltage to said writing means, means connected to said reading means for causing reading to scan along a plurality of paths including each of said channels, said reading means being operable to reproduce the voltages recorded on said medium by said writing means, means for integrating the output voltage from said reading means during the reading scan along each of said plurality of paths, means for providing an indication whenever the output of said integrating means exceeds a predetermined threshold level, said reproducible record medium and said reading and writing means constituting an electrostatic storage tube, means for developing a voltage indicative of the average of the voltages recorded on the screen of said storage tube, second integrating means of identical time constant to said first-mentioned integrating means for integrating such average voltage during each scan of the reading means, means for comparing the two integrated voltages to obtain a difference voltage, a threshold generator for developing a threshold voltage which decreases with time during each such reading scan, means for substracting said difference voltage from said threshold voltage operable to supply a pulse of voltage whenever the difference voltage exceeds the threshold voltage, and means for displaying each such pulse of voltage as a function of the reading scan during which it occurred.

References Cited by the Examiner

UNITED STATES PATENTS

| | | | |
|---|---|---|---|
| Re. 24,720 | 10/59 | McIlwain | 343—17.5 |
| 2,718,609 | 9/55 | Covely | 315—13 |
| 2,897,476 | 7/59 | Widess | 340—15.5 |
| 2,918,600 | 12/59 | Pensak | 315—8.6 |

OTHER REFERENCES

Levin et al.: "A Five Channel Analog Correlator", Tele-Tech and Electronic Industries, Vol. 5, March 1953, pp. 70–72, 120.

Harrington et al.: "Signal-to-Noise Improvement Through Integration in a Storage Tube," Proceedings of the I.R.E., Vol. 38, No. 10, October 1950, pp. 1197–1203.

CHESTER L. JUSTUS, *Primary Examiner.*

KATHLEEN H. CLAFFY, *Examiner.*